(12) United States Patent
Bender et al.

(10) Patent No.: US 7,354,613 B2
(45) Date of Patent: Apr. 8, 2008

(54) METHOD FOR TREATING PROCESSED FOOD PRODUCTS

(75) Inventors: Fredric G. Bender, Mc Murray, PA (US); George Weber, Portland, OR (US)

(73) Assignee: Danisco A/S (DK)

( * ) Notice: Subject to any disclaimer, the term of this patent is extended or adjusted under 35 U.S.C. 154(b) by 556 days.

(21) Appl. No.: 10/737,990

(22) Filed: Dec. 17, 2003

(65) Prior Publication Data

US 2004/0142077 A1 Jul. 22, 2004

(51) Int. Cl.
*A23B 4/02* (2006.01)

(52) U.S. Cl. .................. 426/332; 426/334; 426/335

(58) Field of Classification Search ........ 426/321–323, 426/331, 332, 334, 335
See application file for complete search history.

(56) References Cited

U.S. PATENT DOCUMENTS

| | | |
|---|---|---|
| 2,129,936 A | 9/1938 | Johnson |
| 3,154,421 A | 10/1964 | Voegeli et al. |
| 3,681,091 A | 8/1972 | Kohl et al. |
| 3,775,543 A | 11/1973 | Zyss et al. ............... 426/371 |
| 4,592,892 A | 6/1986 | Ueno et al. ............... 422/28 |
| 4,683,139 A | 7/1987 | Cheng ..................... 426/265 |
| 4,770,884 A | 9/1988 | Hill et al. |
| 4,788,070 A | 11/1988 | Brotsky et al. ............ 426/264 |
| 4,818,548 A | 4/1989 | Cheng ..................... 426/265 |
| 4,937,092 A | 6/1990 | Brotsky et al. ............ 426/643 |
| 5,069,922 A * | 12/1991 | Brotsky et al. ............ 426/332 |
| 5,096,718 A | 3/1992 | Ayres et al. ............... 426/9 |
| 5,192,570 A | 3/1993 | Bender et al. ............ 426/332 |
| 5,260,061 A | 11/1993 | Ayres et al. ............... 424/115 |
| 5,283,073 A | 2/1994 | Bender et al. ............ 426/332 |
| 5,286,506 A | 2/1994 | Millis et al. .............. 426/335 |
| 5,354,568 A * | 10/1994 | Bender et al. ............ 426/332 |
| 5,387,427 A | 2/1995 | Lawrence et al. ......... 426/573 |
| 5,512,309 A | 4/1996 | Bender et al. ............ 426/332 |
| 5,573,797 A | 11/1996 | Wilhoit |
| 5,573,800 A | 11/1996 | Wilhoit |
| 5,573,801 A | 11/1996 | Wilhoit |
| 5,635,484 A | 6/1997 | Ayres et al. ............... 514/18 |
| 5,780,085 A | 7/1998 | Ruzek ..................... 426/281 |
| 5,891,499 A | 4/1999 | Balsano ................... 426/335 |
| 5,976,593 A | 11/1999 | Ruzek ..................... 426/281 |
| 5,985,342 A | 11/1999 | Ruzek ..................... 426/281 |
| 5,989,610 A | 11/1999 | Ruzek ..................... 426/281 |
| 5,989,612 A | 11/1999 | King et al. ............... 426/335 |
| 6,207,210 B1 | 3/2001 | Bender et al. ............ 426/335 |
| 6,277,801 B1 | 8/2001 | Dahanayake et al. ...... 510/218 |
| 6,287,617 B1 | 9/2001 | Bender et al. ............ 426/335 |
| 6,447,810 B1 | 9/2002 | Choi et al. |
| 6,451,365 B1 | 9/2002 | King et al. ............... 426/326 |
| 6,475,537 B1 | 11/2002 | King et al. ............... 424/778 |
| 6,919,099 B2 * | 7/2005 | Bender et al. ............ 426/331 |
| 2003/0185900 A1 | 10/2003 | Choi et al. |

FOREIGN PATENT DOCUMENTS

| | | |
|---|---|---|
| GB | 2 009 222 A | 6/1979 |
| JP | 2000-245419 | 9/2000 |
| WO | WO 02/41903 | 5/2002 |
| WO | WO 03/003842 | 1/2003 |

OTHER PUBLICATIONS

International Search Report for PCT/US02/21234 The Effect of pH Adjustment on the Microbiology of Chicken Scald-tank Water with Particular Reference to the Death Rate of *Salmonellae*—T. J. Humphrey, et al., Journal of Applied Bacteriology 1981, 51, pp. 517-527.
Chemical Pasteurization of Poultry Meat, J. S. Teotia, Dissertation Abstracts Int'l. B., 1974, 34(a), 4142 The Antimicrobial Effect of Phosphate With Particular Reference to Food Products, L. L. Hargreaves, et al. The British Food Manufacturing Industries Research Association, Scientific and Technical Surveys, No. 76, Apr. 1972, pp. 1-20 at p. 12.
AMI Fact Sheet: Case Ready Meats—2 Pages, no date.
N. Kurita, M. Miyaji, R. Kurane, and Y. Tokahara, "Antifungal Activity of Components of Essential Oils," Agric. Biol. Chem., 45(4), pp. 945-952 (1981) Japan.
J. Jay and G. Rivers, "Antimicrobial Activity of Some Food Flavoring Compounds," Journal of Food Safety 6, pp. 129-139 (1984) Westport, Connecticut, U.S.

* cited by examiner

*Primary Examiner*—Arthur L. Corbin
(74) *Attorney, Agent, or Firm*—Fay Sharpe LLP

(57) ABSTRACT

Contacting a processed food product with an aqueous solution containing an effective amount of an alkali silicate reduces bacterial contamination of the product or retards bacterial growth on the product or both reduces bacterial contamination and retards bacterial growth on the product, without substantial detriment to the organoleptic properties of the product.

27 Claims, No Drawings

METHOD FOR TREATING PROCESSED FOOD PRODUCTS

FIELD OF THE INVENTION

This invention relates to an improved method for treating processed food products to reduce bacterial contamination of such products or retard bacterial growth on such products.

BACKGROUND OF THE INVENTION

Many foods, particularly meats, such as, for example, beef, pork, and poultry, are processed and/or cooked to produce convenience food products, such as, for example, delicatessen-style meat products, for human consumption. Such products may be contaminated with unwanted bacteria during processing, which may multiply depending upon the sanitary conditions employed in further handling and storage of the products. Bacterial contamination of processed food products may cause spoilage of such products and illness of consumers of the contaminated food products.

SUMMARY OF THE INVENTION

In a first aspect, the present invention is directed to a method for treating processed food products to reduce bacterial contamination of such products or retard bacterial growth on such products, comprising contacting the processed product with an aqueous solution comprising an effective amount of an alkali silicate.

In a first embodiment, the processed food product is a processed meat food product.

In a second embodiment, the processed food product is a cheese.

The treatment method of the present invention allows simple and economical washing of processed food products to reduce bacterial contamination of such products and/or retard bacterial growth on such products, without substantial detriment to the organoleptic properties of the treated products.

DETAILED DESCRIPTION OF INVENTION AND PREFERRED EMBODIMENTS

In a preferred embodiment, the treatment solution of the present invention is effective as a bacteriocide under the treatment conditions and killing bacteria is one mechanism by which the treatment of the present invention reduces bacterial contamination on the food product.

As used herein, the terminology "reduce bacterial contamination or retard bacterial growth" refers generally to reducing bacterial contamination or retarding bacterial growth, as well as reducing bacterial contamination and retarding bacterial growth.

As used herein, the terminology "processed food product" refers generally to processed meat food products, and to cheeses.

As used herein, the terminology "processed meat food product" refers generally to a food product made by processing the edible remains of any dead animal, including birds, fish, crustaceans, shellfish and mammals. Birds include for example, chickens, turkeys, geese, capon, game hens, pigeon, ducks, guinea fowl, pheasants, quail and partridges. Fish include, for example, catfish, trout, salmon, flounder, tuna, swordfish, and shark. Crustaceans include, for example, crayfish, shrimp, prawns, crabs and lobsters. Shellfish include clams, scallops, oysters and mussels. Mammals include cattle, pigs, sheep, lambs and goats.

Typically, the carcass of a slaughtered animal is first eviscerated, that is, the internal organs of the animal are removed, and skinned. Processed meat food products may be made by subjecting an animal carcass to one or more processing steps in addition to evisceration and skinning. Such processing steps may include, for example dismembering the animal carcass to form portions of the animal carcass, boning a portion of the animal carcass to separate an edible meat portion of the animal from a bone portion of the animal, cutting, including, slicing, chopping, or grinding, an edible meat portion of the animal into pieces, forming one or more edible meat portions or pieces of one or more edible meat portions of the animal, either alone or in combination with other ingredients, into a desired form, such as, for example, a patty, a loaf, or a sausage, and cooking, for example, by baking, roasting, braising or boiling, the animal carcass, a portion of the animal carcass, an edible meat portion of the animal or a processed edible meat portion of the animal.

Processed meat products include, for example, whole hams, whole or partial turkey breasts, fish cakes, fish fillets, smoked fish, delicatessen-style meat products, such as for example, baked ham, boiled ham, roasted turkey breast, roast beef, corned beef, pastrami, bologna, capicola, mortadella, salami, chicken loaf, chicken roll, turkey loaf, turkey roll, and hot dogs.

The term "cheeses" includes, for example, American cheese, cheddar, provolone, colby mozzarella, Monterey Jack, semisoft cheeses, and cheese blends.

A used herein in reference to food products, the terminology "organoleptic properties" means the sensory properties, including the appearance, texture, taste and smell, of such food products.

The bacterial contamination addressed by the method of the present invention may be Gram negative bacteria or Gram positive bacteria and includes pathogenic bacteria and spoilage bacteria, such as, for example, *Listeria monocytogenes, Salmonella typhimurium, Salmonella choleraesuis, Salmonella enteriditis, Escherichia. coli, Camphylobacter* sp., *Pseudomonus aeruginosa, Serratia liquefaciens, Clostridium* sp. and lactic acid forming bacteria, for example, *Lactobacillus* sp., such as *Lactobacillus aviarius*.

In a preferred embodiment, the alkali silicate exhibits a solubility of greater than 0.5 percent by weight (wt %) more typically greater than 3 wt %, in water.

Compounds suitable as the alkali silicate component of the treatment solution of the present invention are crystalline or amorphous alkali silicate compounds according to formula (1):

$$M_2O.m(SiO_2).nH_2O \quad (1)$$

wherein:

M is sodium or potassium, m is a number, wherein $0.5 \leq m \leq 3.5$, indicating the number of mole(s) of the $SiO_2$ moiety per 1 mole of $M_2O$ moiety; and n indicates the water content, expressed as wt % water, wherein $0\% \leq n \leq 55\%$.

Suitable alkali silicates include, for example, sodium disilicates, sodium metasilicates, potassium disilicates, and potassium metasilicates, and may be in anhydrous or hydrated form.

In one embodiment, the alkali silicate comprises one or more metasilicates, which are crystalline products, according to $M_2O.(SiO_2).n'H_2O$, wherein M is Na or K and n' is 0, 5, 6 or 9 and indicates the number of moles of water per $SiO_2$ moiety. In a preferred embodiment, the alkali silicate comprises one or more of anhydrous sodium metasilicate, anhydrous potassium metasilicate, sodium metasilicate pentahydrate, sodium metasilicate hexahydrate and sodium metasilicate nonahydrate. More typically, the alkali silicate comprises one or more of anhydrous sodium metasilicate, anhydrous potassium metasilicate and sodium metasilicate pentahydrate. Even more typically, the alkali silicate comprises one or more of anhydrous sodium metasilicate and anhydrous potassium metasilicate, and one or more of sodium metasilicate pentahydrate and potassium metasilicate pentahydrate.

In one embodiment, the aqueous solution comprises greater than or equal to 0.05 percent by weight (wt %) alkali silicate, more typically from 0.1 wt % to saturation, still more typically from 1 to 15 wt %, and even more typically from 5 to 10 wt %, alkali silicate, wherein the ranges are calculated on the basis of the weight of the anhydrous alkali silicate. Either the anhydrous form or a hydrated form of the alkali silicate may be used to form the treatment solution, provided that the appropriate adjustment is made to compensate for the weight of any associated water of hydration. Unless otherwise specified, the concentrations of alkali silicates given herein are based on the weight of anhydrous alkali silicate.

In another embodiment, the aqueous solution comprises from 0.1 to 8 wt %, more typically from 1 to 6 wt % and even more typically from 2 to 4 wt % alkali silicate.

In another embodiment, the aqueous solution comprises an amount of alkali silicate, typically from greater than 3 wt % to 6 wt %, more typically from greater than 3 wt % to 5 wt % alkali silicate, effective to reduce bacterial contamination of the food product. In one embodiment, the method of the present invention is suitable as the primary step of a product processing line for reducing bacterial combination of the product below a target value.

In an alternative embodiment, the aqueous solution comprises an amount of alkali silicate, typically from 0.5 wt % to 4 wt % alkali silicate more typically from 0.5 to 3 wt % alkali silicate, that is effective to retard bacterial growth on the food product, but that is not necessarily sufficient to kill bacteria or otherwise reduce bacterial contamination of the product. In one embodiment, the less concentrated alkali silicate solution is used in combination with other treatments, such as, for example, treating the product with aqueous lactic acid solution, washing the product with hot water, e.g., at a temperature of from about 160° F. to about 180° F., cleaning the product with steam and vacuum, and, either before or after packaging the product for sale, pasteurizing or irradiating the product, wherein the series of treatments are, in combination, effective to reduce bacterial contamination of the food product below a target value.

In another embodiment, the aqueous solution consists essentially of a solution of alkali silicate in water. In yet another embodiment, the aqueous solution consists of a solution of alkali silicate in water. As used herein, the term "water" means tap water, that is, water as available onsite without requiring purification, that may contain minor amounts of components other than $H_2O$.

The aqueous solution may, optionally, further comprise an alkali carbonate according to formula (2):

$$M'_{2-a}H_aCO_3.n'H_2O \quad (2)$$

wherein:

M' is sodium or potassium, a is 0 or 1, and n" is a number wherein $0 \leq n" \leq$ fully hydrated.

Suitable alkali carbonates may be in anhydrous or hydrated form and include, for example, sodium carbonate, potassium carbonate, sodium bicarbonate and potassium bicarbonate. In a preferred embodiment, the treatment solution comprises one or more of sodium carbonate and potassium carbonate.

In one embodiment, the aqueous solution comprises greater than or equal to 0.05 wt % of an alkali silicate and greater than or equal to 0.05 wt % of an alkali carbonate.

In another embodiment, the aqueous solution comprises from 0.1 wt % to saturation, more typically from 0.5 to 10 wt %, and even more typically from 3 to 8 wt % alkali silicate, and from 0.1 wt % to saturation, more typically from 0.2 to 15 wt %, and even more typically from 0.4 to 10 wt %, of the alkali carbonate.

In another embodiment, the aqueous solution consists essentially of a solution of alkali silicate and alkali carbonate in water. In yet another embodiment, the aqueous solution consists of a solution of alkali silicate and alkali carbonate or alkali bicarbonate in water.

The treatment solution may, optionally, further comprise an alkali hydroxide according to formula (3):

$$M"OH \quad (3)$$

wherein:

M" is sodium or potassium.

Suitable alkali hydroxides include, for example, sodium hydroxide, potassium hydroxide. Typically, the hydroxide comprises sodium hydroxide.

In one embodiment, the aqueous solution comprises greater than or equal to 0.05 wt % of an alkali silicate and greater than or equal to 0.05 wt % of an alkali hydroxide.

In another preferred embodiment, the aqueous solution comprises from 0.1 wt % to saturation more typically from 0.5 to 10 wt %, and even more typically from 3 to 8 wt % alkali silicate and from 0.5 to 5 wt %, more typically from 0.1 to 2 wt %, and even more typically from 0.2 to 1 wt % of the alkali hydroxide.

In another embodiment, the aqueous solution consists essentially of a solution of alkali silicate and alkali hydroxide in water. In yet another embodiment, the aqueous treatment solution consists of a solution of alkali silicate and alkali hydroxide in water.

In another embodiment, the aqueous solution comprises greater than or equal to 0.05 wt % of an alkali silicate, greater than 0.05 wt % of an alkali carbonate and greater than or equal to 0.05 wt % of an alkali hydroxide.

In another embodiment, the aqueous solution comprises from 0.1 wt % to saturation, more typically from 0.5 to 10 wt % alkali silicate, and even more typically from 3 to 8 wt % alkali silicate, from 0.1 wt % to saturation, more typically from 0.2 to 15 wt %, and even more typically from 0.4 to 10 wt %, alkali carbonate and 0.5 to 5 wt %, more typically from 0.1 to 2 wt %, and even more typically from 0.2 to 1 wt % alkali hydroxide.

In another embodiment, the aqueous solution consists essentially of a solution of alkali silicate, alkali carbonate and alkali hydroxide in water. In an alternative preferred embodiment, the aqueous solution consists of a solution of alkali silicate, alkali carbonate and alkali hydroxide in water.

The aqueous solution may, optionally, further comprise other components, such as for example, alkali metal salts, such as for example, NaCl, KCl, and surfactants suitable for food use.

In a preferred embodiment, the aqueous solution of the present invention comprises less than 0.5 wt %, more typically less than 0.2 wt %, ethanol. Even more typically the treatment solution is substantially free, more typically free, of ethanol.

In one embodiment, the aqueous solution may further comprise less than 10 wt % alkali phosphate, typically less than 5 wt % alkali phosphate and more typically less than 2 wt % alkali phosphate, in order to provide an aqueous treatment solution with a reduced phosphate content compared to know alkali phosphate antimicrobial treatments.

In another embodiment, the aqueous solution of the present invention does not add any substantial amount of phosphates to the product processing waste stream and comprises, prior to use, less than 0.2 wt %, more typically less than 0.1 wt %, trialkali phosphate. Even more typically, the aqueous solution is, prior to use, substantially free, more typically free, of trialkali phosphate. Phosphates of animal origin may be present in used or recycled treatment solution and in product processing waste streams.

In one embodiment, the aqueous solution exhibits a pH of from about 11.5 to about 14, more typically from about 12 to about 13.75, even more typically from about 12.25 to about 13.5 and still more typically from about 12.75 to about 13.25.

The aqueous solution is typically made by dissolving the components of the solution in water.

In one embodiment, the processed food product is contacted with the aqueous solution after processing and before packaging by dipping the product in the aqueous solution or by spraying the aqueous solution on the product. In a preferred embodiment, the processed food product is contacted with the aqueous solution by spraying the aqueous solution under a gage pressure of greater than 2 pounds per square inch above atmospheric pressure (psig), more typically from 2 to 400 psig, onto all accessible surfaces of the processed food product.

In one embodiment, the aqueous solution is at a temperature of from about 0 to about 85° C., more typically from 0 to about 70° C., still more typically from about 10° C. to about 50° C. and even more typically from about 20° C. to about 40° C.

In one embodiment, the processed food product is contacted with the aqueous solution for greater than or equal to about 1 second to about 5 minutes, more typically from about 5 seconds to about 2 minutes, and even more typically from about 15 seconds to about 1 minute. The preferred contact times refer to the duration of the active application process, for example, dipping or spraying, used to contact the aqueous treatment solution with the product. Once applied, the aqueous solution can be immediately rinsed off of the product or, alternatively, allowed to remain on the processed food product.

Processed food product that have been treated according to the present invention can, immediately after such treatment, be processed according to normal process conditions, such as draining, chilling, and/or packaging for sale. Optionally, the aqueous solution residue may be rinsed from the treated product prior to further processing.

In one embodiment, the aqueous solution is recovered and recycled. The recovered aqueous solution may, optionally, be filtered to remove solids prior to recycling. The respective amounts of the one or more components of the aqueous solution may, optionally, be monitored and the composition of the aqueous solution controlled by adding water and/or additional amounts of the metasilicate, carbonate and/or hydroxide components to the solution.

EXAMPLE 1

Fresh cultures of *Listeria monocytogenes* MFS 2 and a lactic acid bacteria (*Lactobacillus aviarius*) isolated from spoiled meat were suspended in BHI broth at about 6 log/ml, sodium metasilicate stock solution was added to the inoculated BHI broth in a series of dilutions to give respective final concentrations in the broth of 0, 0.5, 1.25, 2.5, and 5% sodium metasilicate. The cells were treated in the sodium metasilicate containing broth at room temperature for 10 min and then were removed from the system by centrifugation. The cells were then re-suspended and washed once in BHI broth and plated on Tryptic Soy Agar (TSA). The plate count was performed after incubation at 30° C. for 48 hours. Results are given below in TABLE I as colony forming units per milliliter (CFU/ml). As used herein, the notation mEn, wherein m and n are each numbers means $m \times 10^n$, for example, 3.5E05 means $3.5 \times 10^5$.

TABLE I

| Sodium metasilicate (%) | pH | *Listeria monocytogenes* (CFU/ml) | *Lactobacillus aviarius* (CFU/ml) |
|---|---|---|---|
| 0 | 7.28 | 3.5E05 | 1E06 |
| 0.5 | 10.35 | 3.0E05 | 9E05 |
| 1.25 | 11.85 | 810 | 10 |
| 2.5 | 12.63 | 10 | 60 |
| 5 | 12.94 | <10 | <10 |

EXAMPLE 2

All work was conducted under a sterilized Biosafety hood.

One colony from refrigerated plates of each of 5 *Listeria monocytogenes* strains (received from USDA lab—isolated from meat) were transferred to a separate tube of (Brain Heart Infusion) BHI broth. The tubes were incubated overnight at 32° C. A transfer was then made from each of the tubes into a separate tube of fresh BHI broth, at 1% inoculation. The newly inoculated tubes (the "$2^{nd}$ tubes") were then incubated for 20 hours at 32° C.

Each of the $2^{nd}$ tubes was then chilled on ice for 2 hours. One milliliter on the contents of each of the $2^{nd}$ tubes was transferred into one common 99 ml bottle of chilled Butterfield's phosphate buffer. After all 5 strains were added, the contents of the bottle were mixed well and then chilled an additional 2 hours on ice. Four percent (4%) and six percent (6%) solutions of anhydrous sodium metasilicate were made using sterile deionized ("DI") water in a sterilized bottle containing a stirbar. The solutions were allow to mix for 30 minutes to completely dissolve the sodium metasilicate. One bottle of the sterile deionized water was kept as a control.

A package of uncut turkey loaf (Jennio-Turkey, an oven-roasted turkey loaf, with no added nitrite, that was purchased uncut from a supermarket deli) was opened and drained. Slices of the surface of the loaf were cut off the loaf, keeping each slice at least 5 mm thick. The center part of the turkey loaf was discarded. The surface slices were cut into 5×5 cm square pieces. Each 5×5 cm piece was placed onto the lid of a sterile rectangular plate, to make a total of 18 pieces, 6 for each treatment (4% sodium metasilicate, 6% sodium metasilicate and deionized water control). In each case, the cooked outer surface of the piece was facing up and the piece was resting against lid side.

0.1 ml of the cooled *L. monocytogenes* dilution was added onto the cooked surface of each 5×5 cm piece of meat and spread with a sterile L-shaped spreader, making sure in each case that none of inoculum went off of the cooked surface. The plates were allowed to dry under the hood for 30 minutes.

Each piece of meat was rinsed by using 20 mls of water, or a 4% solution of sodium metasilcate or a 6% solution of sodium metasilicate, in each case applied by gravity flow from a sterile 25 ml plastic pipette. The rinse time was between 3.5-4.0 seconds. The order of rinsing was: 6 pieces by water, then 6 pieces by the 4% solution, and then 6 pieces by the 6% solution. After a piece was drained of rinse, it was transferred to a sterile whirlpack bag and the bag was placed in 4° C. incubator.

After 30 minutes, 3 pieces of each treatment were sampled by washing 20 mls of sterile Butterfield's buffer was added to the respective bag and each piece was washed vigorously by shaking and massaging outside of bag. Serial dilutions of the wash were made in buffer and then the wash samples were spread plated onto Oxford (selective for *Listeria*) and TSA plates. The inoculum was also plated onto Oxford plates. All plates were incubated for 3 days at 32° C.

After 24 hours the remaining 3 samples from each rinse were taken from the 4° C. and sample in the same manner described above.

After 3 days countable plates were counted. All colonies appeared typical of *L. monocytogenes*, including those on the TSA plates. Cell numbers were calculated back to number of *L. monocytogenes* per piece. (Each chilled inoculum contained 9.6E06 CFU/ml. Since 0.1 ml of inoculum was applied per each piece of turkey loaf, each piece should have carried 9.6E05 colony forming units/piece.) The plate count for each plate and the arithmetic average count for each set of three replicates are set forth below in TABLE II.

TABLE II

A. Oxford agar counts, 30 minute after rinse:

| Rinse type | Plate A1 | Plate A2 | Plate A3 | Average |
|---|---|---|---|---|
| Control-water | 4.0E05 | 7.2E05 | 6.2E05 | 5.8E05 |
| 4% rinse | 4.8E05 | 6.4E05 | 4.8E05 | 5.3E05 |
| 6% rinse | 4.0E05 | 4.0E05 | 4.6E05 | 4.2E05 |

B. TSA agar counts, 30 minute after rinse:

| Rinse type | Plate B1 | Plate B2 | Plate B3 | Average |
|---|---|---|---|---|
| Control-water | 8.0E05 | 8.2E05 | 9.2E05 | 8.5E05 |
| 4% rinse | 5.2E05 | 7.8E05 | 7.6E05 | 6.9E05 |
| 6% rinse | 5.2E05 | 3.6E05 | 4.6E05 | 4.5E05 |

C. Oxford agar counts, 24 hours after rinse:

| Rinse type | Plate C1 | Plate C2 | Plate C3 | Average |
|---|---|---|---|---|
| Control-water | 8.0E05 | 8.2E05 | 7.8E05 | 8.0E05 |
| 4% rinse | 3.2E05 | 3.6E05 | 4.0E05 | 3.6E05 |
| 6% rinse | 1.3E05 | 2.4E05 | 1.9E05 | 1.9E05 |

D. TSA agar counts, 24 hours after rinse:

| Rinse type | Plate D | Plate D2 | Plate D3 | Average |
|---|---|---|---|---|
| Control-water | 8.0E05 | 6.2E05 | 8.8E05 | 7.7E05 |
| 4% rinse | 4.4E05 | 3.6E05 | 2.8E05 | 3.6E05 |
| 6% rinse | 1.7E05 | 2.8E05 | 2.6E05 | 2.4E05 |

The number of *Listeria* colonies determined from the plating appear to be very consistent. The numbers recovered were close to what was theoretically put on showing that even the water rinse did remove some bacteria. Slightly more were recovered on TSA agar as compared to Oxford, this is expected since it is a non-selective medium. Any cells that may be weak or slightly damaged are more likely to grow on the TSA agar than on Oxford. There did not appear to be any background contaminants growing on the plates—all colonies looked similar and typical of *L. monocytogenes*.

The sodium metasilicate rinse provided a reduction in *Listeria monocytogenes* count compared to the control count, with the 6% treatment providing a greater reduction in *Listeria monocytogenes* count than the 4% treatment.

The invention claimed is:

1. A method for treating a processed food product to reduce bacterial contamination of the processed food product or to retard bacterial growth on the processed food product, comprising contacting the processed food product with an aqueous solution in an amount effective to reduce said contamination or to retard said growth, said aqueous solution consisting essentially of (a) an alkali silicate, an alkali carbonate and an alkali hydroxide or (b) an alkali silicate and an alkali hydroxide.

2. The method of claim 1, wherein the alkali silicate comprises one or more crystalline or amorphous alkali silicate compound according to the formula:

$$M_2Om(SiO2)nH_2O$$

wherein:
M is sodium or potassium,
m is a number, wherein $0.5 \leq m \leq 3.5$, indicating the number of mole(s) of the $SiO_2$ moiety per 1 mole of $M_2O$ moiety; and
n indicates the water content, expressed as wt % water, wherein $0\% \leq n \leq 55\%$.

3. The method of claim 1, wherein the alkali silicate comprises one or more crystalline metasilicate according to $M_2O(SiO_2)n'H_2O$, wherein M is Na or K and n' is 0, 5, 6 or 9 and indicates the number of moles of water per $SiO_2$ moiety.

4. The method of claim 1, wherein the alkali silicate comprises one or more of anhydrous sodium metasilicate, anhydrous potassium metasilicate, sodium metasilicate pentahydrate, sodium metasilicate hexahydrate and sodium metasilicate nonahydrate.

5. The method of claim 1, wherein the aqueous solution comprises greater than or equal to 0.05 percent by weight alkali silicate.

6. The method of claim 1, wherein the aqueous solution comprises from 1 to 15 percent by weight alkali silicate.

7. The method of claim 1, wherein the aqueous solution comprises one or more alkali carbonate or alkali bicarbonate compound according to formula:

wherein:
M' is sodium or potassium, a is 0 or 1, and n" is a number wherein $0 \leq n" \leq$ fully hydrated.

8. The method of claim 1, wherein the aqueous solution comprises an alkali carbonate selected from sodium carbonate, potassium carbonate sodium bicarbonate and potassium bicarbonate, each of which may be in anhydrous or hydrated form, and mixtures thereof.

9. The method of claim 1, wherein the aqueous solution comprises greater than 0.05 percent by weight alkali silicate and greater than 0.05 percent by weight alkali carbonate.

10. The method of claim 1, wherein, the aqueous solution comprises from 0.5 to 10 percent by weight alkali silicate and from 0.2 to 15 percent by weight alkali carbonate.

11. The method of claim 1, wherein the aqueous solution comprises an alkali hydroxide according to formula:

M"OH wherein:

M" is sodium or potassium.

12. The method of claim 1, wherein the aqueous solution comprises sodium hydroxide as the alkali hydroxide.

13. The method of claim 1, wherein the aqueous solution comprises greater 1 than 0.05 percent by weight alkali silicate and greater than 0.05 percent by weight alkali hydroxide.

14. The method of claim 1, wherein the aqueous solution comprises from 0.5 to 10 percent by weight alkali silicate from 0.1 to 2 percent by weight alkali hydroxide.

15. The method of claim 1, wherein the aqueous solution comprises greater than or equal to 0.05 percent by weight alkali silicate, greater than or equal to 0.05 percent by weight alkali carbonate and greater than or equal to 0.05 percent by weight alkali hydroxide.

16. The method of claim 1, wherein the aqueous solution comprises from 0.5 to 10 percent by weight alkali silicate, from 0.2 to 15 percent by weight alkali carbonate and from 0.1 to 2 percent by weight alkali hydroxide.

17. The method of claim 1, wherein the processed food product is contacted with the aqueous solution after processing and before packaging by dipping the product in the aqueous solution or by spraying the aqueous solution on the processed food product.

18. The method of claim 17, wherein the duration of the dipping or spraying is from about 1 second to about 5 minutes.

19. The method of claim 1, wherein the processed food product is contacted with the aqueous solution by spraying the aqueous solution onto the processed food product under a gage pressure of greater than 2 pounds per square inch.

20. The method of claim 1, wherein the processed food product is contacted with the aqueous solution by spraying the aqueous solution onto the processed food product under a gage pressure of 3 to 40 pounds per square inch.

21. The method of claim 1, wherein the aqueous solution is at a temperature of from 0 to about 85° C.

22. The method of claim 1, wherein the aqueous solution is at a temperature of from 0 to about 70° C.

23. The method of claim 1, wherein the aqueous solution is recovered after contacting the food product and is recycled.

24. The method of claim 1, wherein the processed food product is a processed meat food product.

25. A method for treating a processed food product to reduce bacterial contamination of the processed food product or to retard bacterial growth on the process food product, comprising contacting the processed food product with a substantially ethanol free aqueous solution in an amount effective to reduce said contamination or to retard said growth, said aqueous solution consisting essentially of (a) an alkali silicate, an alkali carbonate and an alkali hydroxide or (b) an alkali silicate and an alkali hydroxide.

26. The method of claim 25, wherein the aqueous solution comprises greater than or equal to 0.05 percent by weight alkali carbonate and greater than or equal to 0.05 percent by weight alkali hydroxide.

27. The method of claim 25, wherein the aqueous solution comprises from 0.1 percent by weight to saturation of alkali carbonate and from 0.5 to 5 percent by weight alkali hydroxide.

* * * * *